(12) United States Patent
Bhar

(10) Patent No.: US 8,811,295 B2
(45) Date of Patent: Aug. 19, 2014

(54) METHODS AND APPARATUS FOR PRIORITY-BASED ADOPTION OF AN ACCESS DEVICE

(75) Inventor: Subhrajyoti Bhar, Milpitas, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1398 days.

(21) Appl. No.: 12/188,411

(22) Filed: Aug. 8, 2008

(65) Prior Publication Data

US 2010/0034178 A1    Feb. 11, 2010

(51) Int. Cl.
*H04W 4/00* (2009.01)
*H04W 28/16* (2009.01)
*H04W 8/30* (2009.01)

(52) U.S. Cl.
CPC ............... *H04W 28/16* (2013.01); *H04W 8/30* (2013.01)
USPC ........................................................ 370/329

(58) Field of Classification Search
USPC ........................................................ 370/329
See application file for complete search history.

(56) References Cited

U.S. PATENT DOCUMENTS

| | | | |
|---|---|---|---|
| 7,340,325 B2 * | 3/2008 | Sousa et al. ................... | 700/295 |
| 2003/0163557 A1 * | 8/2003 | Zollner et al. ................. | 709/223 |
| 2004/0236856 A1 * | 11/2004 | Keohane et al. .............. | 709/229 |
| 2007/0225024 A1 * | 9/2007 | Li ................................. | 455/518 |
| 2008/0056121 A1 * | 3/2008 | Tsai et al. ..................... | 370/216 |

* cited by examiner

*Primary Examiner* — Mark Rinehart
*Assistant Examiner* — Maharishi Khirodhar

(57) ABSTRACT

Apparatus and methods are provided for priority-based adoption of access devices coupled to a wireless switch. A method comprises maintaining a respective adoption priority for each of a plurality of access devices adopted by the wireless switch. The method further comprises receiving, in response to a disconnection event, an adoption request from a first access device coupled to the wireless switch, wherein the first access device has an adoption priority. The method further comprises analyzing the adoption priority for the first access device, and responding to the adoption request in a manner that is influenced by the analysis.

11 Claims, 4 Drawing Sheets

METHODS AND APPARATUS FOR PRIORITY-BASED ADOPTION OF AN ACCESS DEVICE

TECHNICAL FIELD

Embodiments of the subject matter described herein relate generally to wireless network infrastructures, and more particularly, embodiments of the subject matter relate to priority-based adoption of access devices.

BACKGROUND

Many wireless networks (such as wireless local area networks or WLANs), rely on infrastructure components that establish data communication links with wireless client devices. A wireless client device communicates, via a wireless data communication channel, with a wireless access device (such as an access point or access port device), which in turn communicates with other network components via traditional wired interfaces. Large wireless networks often utilize numerous access devices spread throughout an area, such as a building or campus. In most large wireless networks, these access devices are supported or adopted by a wireless switch. The wireless switch provides centralized network management for the access devices adopted by the wireless switch and supports communications to/from the access devices and other devices, components, or networks.

Most wireless switches are limited in the number of access devices they can adopt or support at one time, either by hardware (e.g., the number of physical ports or processing capability of the switch) or software (e.g., the switch is only licensed for a given number of access devices). In many situations, the wireless switch is oversubscribed, that is, more access devices are connected to the wireless switch than it can support at one time. For example, a wireless network may be designed with a high-density of access devices in an area in order to maintain coverage if one of the access devices fails. While all of these access devices may be physically connected to the wireless switch, not all of the access devices will be adopted by the wireless switch.

A failure at the wireless switch (e.g., loss of power or software error) generally causes the wireless switch to reset or otherwise return to a state where no access devices are adopted. This causes data transfer from the previously adopted access devices to be temporarily interrupted. When the wireless switch comes back online, each access device connected to the wireless switch generally sends an adoption request to the wireless switch. It is desirable that the previously adopted access devices which were transferring data be adopted again by the wireless switch to allow data transfer to resume and minimize any impact on the end user. However, most wireless switches grant adoption requests from access devices in an ad-hoc basis, and there is no way to control or predict which access devices will be adopted by the wireless switch. Thus, when an oversubscribed wireless switch resumes operation, a number of previously inactive access devices could be adopted, while previously adopted access devices that were actively transmitting data may be denied adoption because the wireless switch has reached its limit of adopted access devices it is capable of supporting.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and wireless client device configurations, and that the system described herein is merely one suitable example.

For the sake of brevity, conventional techniques related to wireless signal processing, wireless data transmission, WLANs, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

Technologies and/or concepts described herein related to methods and systems for priority-based adoption of access devices. The access devices may be dynamically assigned adoption priorities, such that access devices generating a lot of traffic (e.g., number of users, data throughput) or access devices handling certain types of data (e.g., video or audio files) are preferentially adopted when a wireless switch returns from a disconnect event (e.g., power loss, reset).

Figure 1:
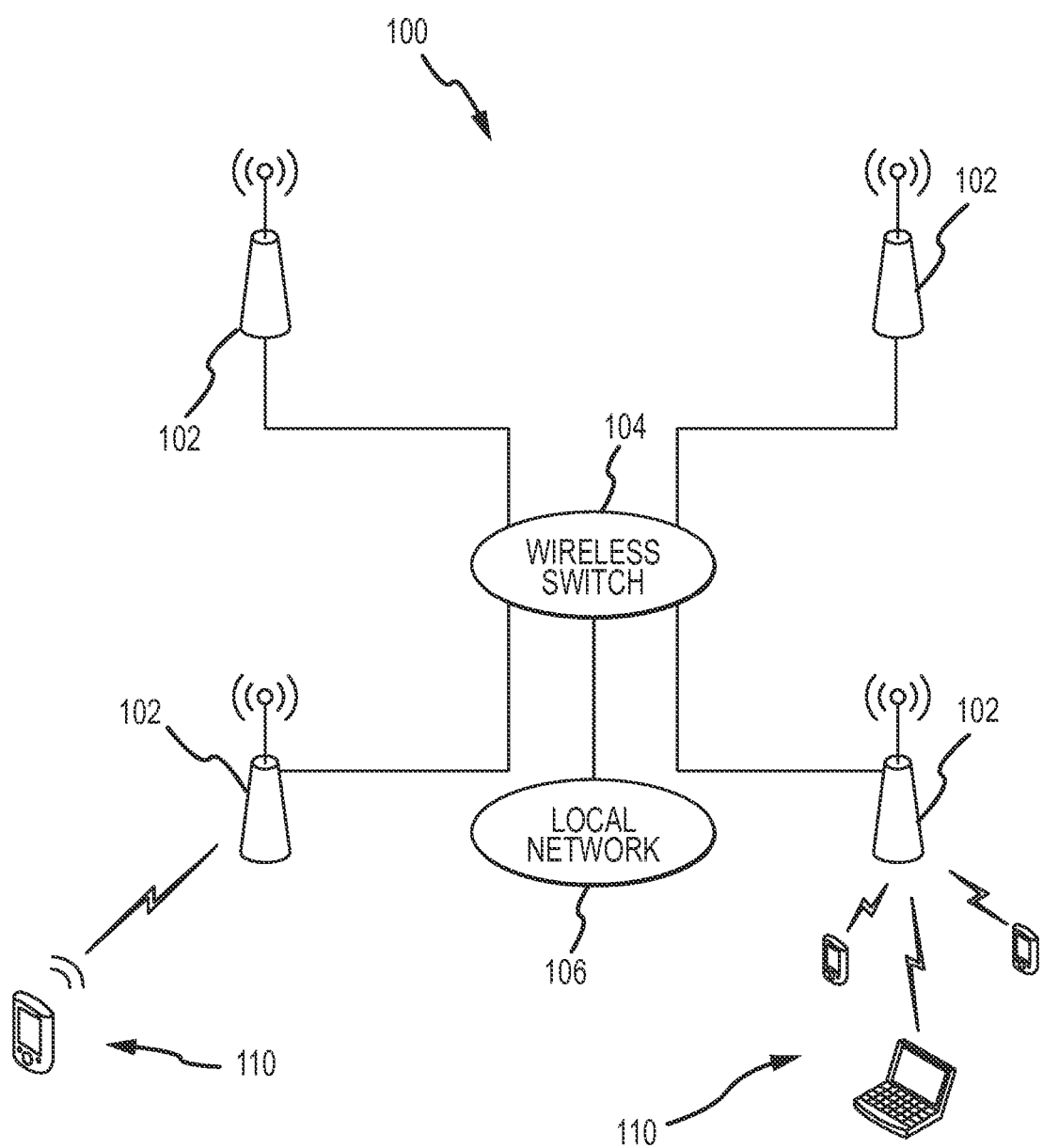
FIG. 1 is a schematic representation of an exemplary wireless network in accordance with one embodiment.

Referring now to FIG. 1, in an exemplary embodiment, a wireless network 100 includes, without limitation, a plurality of wireless access devices 102 and a wireless switch 104. In an exemplary embodiment, the wireless network 100 is configured to support communications between and/or among wireless client devices 110, and may include additional devices to support the functionality of the wireless network 100, such as Ethernet switches, and the like. The wireless switch 104 may be coupled to a local network 106, which in turn may be coupled to one or more additional components and/or computer networks, as will be understood. In an exemplary embodiment, the wireless switch 104 is oversubscribed, that is, the number of access devices 102 coupled to the wireless switch 104 exceeds the adoption limit of the wireless switch 104 as described below.

It should be understood that FIG. 1 is a simplified representation of a wireless network 100 for purposes of explanation. A practical embodiment may have any number of wireless switches 104, each supporting any number of wireless access devices 102, and each wireless access device supporting any number of wireless client devices 110. The topology and configuration of the wireless network 100 can vary to suit the needs of the particular application, and FIG. 1 is not intended to limit the application or scope of the subject matter in any way. In an exemplary embodiment, the wireless network 100 is configured as a wireless local area network (WLAN). In alternative embodiments, the wireless network 100 may be configured as a wireless personal area network (WPAN), a wireless wide area network (WWAN), or any other suitable network configuration. The wireless network 100 may be configured to utilize a data communication protocol in accordance with IEEE 802.11, conventional Internet Protocol techniques, TCP/IP, hypertext transfer protocol (HTTP), SOAP, or another comparable protocol.

In an exemplary embodiment, the wireless access devices 102 are coupled to the wireless switch 104. In this embodiment, the wireless access devices 102 are preferably realized as access ports, which rely on the network intelligence and management functions provided by the wireless switch 104, as described in greater detail below. In this regard, the access ports are "thin" or "lightweight" access devices. In alternate embodiments, the wireless access devices 102 may be realized as access points, which include network intelligence and management functions incorporated therein but are configured to utilize wireless switch 104. In a preferred embodiment, the wireless access devices 102 are physically connected to the wireless switch 104 (e.g., via an Ethernet cable). In alternative embodiments, the wireless access devices 102 may be coupled to the wireless switch 104 via one or more additional wireless switches, access devices, Ethernet switches, routers, and/or various combinations thereof. In this regard, the access devices 102 are at least logically connected to the wireless switch 104, but need not be physically connected to the wireless switch 104. As used herein, an adopted access device 102 should be understood as referring to an access device 102 that is being supported by the wireless switch 104. In an exemplary embodiment, the wireless access devices 102 are configured to receive data from wireless client devices 110 over wireless data communication links. Once that data is captured by the wireless access device 102, the data may be encapsulated (e.g., into a packet format compliant with a suitable data communication protocol) for communication to another access device 102, a wireless client device 110, and/or the local network 106 in a conventional manner.

A wireless client device 110 may be realized using any suitable platform, including, without limitation: a cellular telephone; a personal digital assistant; a digital media player; a portable video game device; a laptop or other portable computer; or the like. In an exemplary embodiment, a wireless client device 110 is configured to periodically scan for access devices 102, select an access device from a list of access devices within range, and send an association request to the selected access device, as will be appreciated in the art. It should be appreciated that the functionality of the wireless client device 110 will largely be dependent on the user, manufacturer, or vendor responsible for configuring and/or designing the wireless client device 110, and the subject matter described herein is not limited to use with a specific wireless client device 110.

Figure 2:
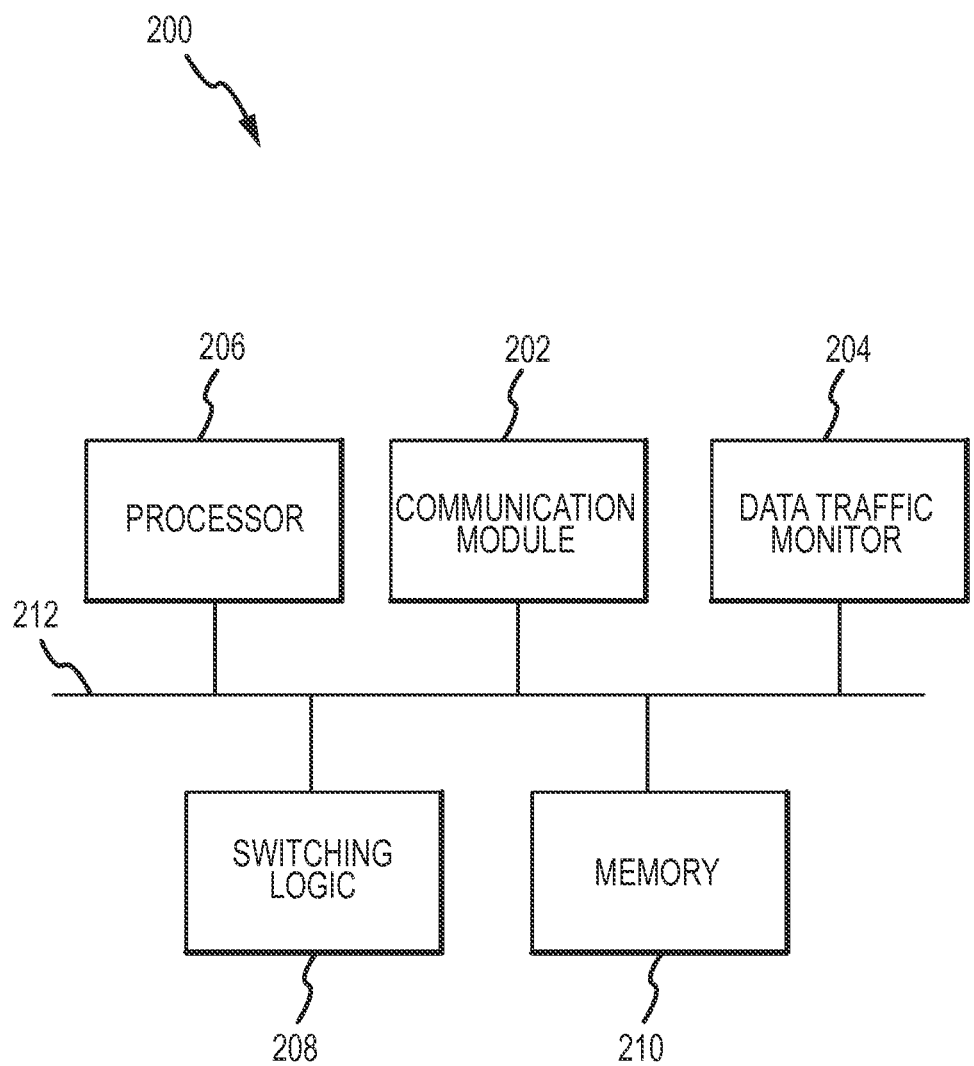
FIG. 2 is a schematic representation of an exemplary wireless switch suitable for use in the wireless network shown in FIG. 1 in accordance with one embodiment.

FIG. 2 is a schematic representation of an embodiment of a wireless switch 200 suitable for use in a network, such as wireless network 100 shown in FIG. 1. In an exemplary embodiment, a wireless switch 200 may include, without limitation: a communication module 202, a data traffic monitor 204, a processor 206, switching logic 208, and a suitable amount of memory 210. The elements of wireless switch 200 may be interconnected together using a bus 212 or another suitable interconnection arrangement that facilitates communication between the various elements of wireless switch 200. It should be appreciated that FIG. 2 depicts the wireless switch 200 in an oversimplified manner, and a practical embodiment may include additional components and suitably configured processing logic to support known or conventional operating features that are not described in detail herein.

In an exemplary embodiment, wireless switch 200 contains intelligence and processing logic that facilitates centralized control and management of WLAN elements, including wireless access devices associated with wireless switch 200. In an exemplary embodiment, one wireless switch 200 can support or adopt any number of wireless access devices up until an adoption limit. The adoption limit of a wireless switch 200 should be understood as referring to the maximum number of wireless access devices that the wireless switch 200 can concurrently support. The adoption limit may be determined by hardware limitations (e.g., a number of physical ports or limitations of processor 206) or software limitations (e.g., the wireless switch 200 is only licensed for use with a limited number of access devices or otherwise only supports a limited number of access devices). Thus, wireless switch 200 is capable of serving multiple wireless access devices, which in turn can serve multiple wireless client devices. Wireless switch 200 is suitably configured to transmit and receive data, and it may serve as a point of interconnection between a WLAN and a fixed wire (e.g., Ethernet) network.

In an exemplary embodiment, communication module 202 generally represents the hardware, software, firmware, processing logic, and/or other components of wireless switch 200 that enable bi-directional communication between wireless switch 200 and network components to which wireless switch 200 is coupled. For example, referring to FIG. 1, communication module 202 is suitably configured to communicate with components on the wireless network 100, such as the wireless access devices 102 and/or the local network 106. The communication module 202 includes a number of physical interfaces or ports for connecting to wireless access devices to the wireless switch 200 and is configured to receive adoption requests from access devices coupled to the wireless switch 200, as described below. In accordance with one embodiment, communication module 202 also provides an Ethernet interface such that wireless switch 200 can communicate with a conventional Ethernet-based computer network. In this regard, communication module 202 may include a physical interface for connection to the computer network, and communication module 202 (and/or processor 206) may handle Ethernet addressing for data packets sent from wireless switch 200.

In an exemplary embodiment, data traffic monitor 204 is configured to monitor the flow, amount, and/or type of data processed by wireless switch 200. Data traffic monitor 204 may be implemented or performed with a processor 206, a content addressable memory, a digital signal processor, an application specific integrated circuit, a field programmable gate array, any suitable programmable logic device, discrete gate or transistor logic, discrete hardware components, or any combination thereof, designed to perform the functions described below. In an exemplary embodiment, data traffic monitor 204 can monitor the throughput, data rate, data volume, packet count, an average data rate, an average data volume, or any quantity or characteristic based upon empirical or statistical information. The monitored data may be unidirectional or bidirectional, depending upon the specific application. In an exemplary embodiment, the data traffic monitor 204 is configured to monitor data and/or network traffic for the individual access devices adopted by the wireless switch 200. For example, the data traffic monitor 204 may implement a table (or list, cache, database or another suitable data structure) that maintains associations of the monitored data and/or statistics and the respective access device transmitting/receiving the data for those access devices adopted by the wireless switch 200. As described in more detail below, the information obtained by data traffic monitor 204 can be utilized to assign adoption priorities to access devices for enabling priority-based adoption of access devices.

In an exemplary embodiment, the processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor 206 includes processing logic that may be configured to carry out the functions, techniques, and processing tasks associated with the operation of the wireless switch 200, as described in greater detail below. Furthermore, the steps of a method or algorithm described in connection with the embodiments disclosed herein may be embodied directly in hardware, in firmware, in a software module executed by processor 206, or in any practical combination thereof.

In an exemplary embodiment, switching logic 208, which may be partially or completely realized in the processor 206, represents processing logic and functionality associated with the data switching and communicating features of wireless switch 200. Switching logic 208 may be configured to perform conventional operations that enable data traffic in the wireless network to be communicated between wireless client devices, access devices, network infrastructure components, and network-based systems or applications. In an exemplary embodiment, switching logic 208 and processor 206 may be cooperatively configured to implement processing logic and functionality associated with the handling of adoption requests that originate at access devices, as described in greater detail below.

In an exemplary embodiment, memory 210 includes sufficient data storage capacity to support the operation of wireless switch 200. Memory 210 may be realized as RAM memory, flash memory, registers, a hard disk, a removable disk, or any other form of storage medium known in the art. In this regard, memory 210 can be coupled to processor 206 such that processor 206 can read information from, and write information to, memory 210. In the alternative, memory 210 may be integral to processor 206. In accordance with one embodiment, one or more software modules may reside in memory 210. In an exemplary embodiment, memory 210 is utilized to store information associated with various wireless access devices associated with the wireless switch 200, as described in greater detail below.

Figure 3:
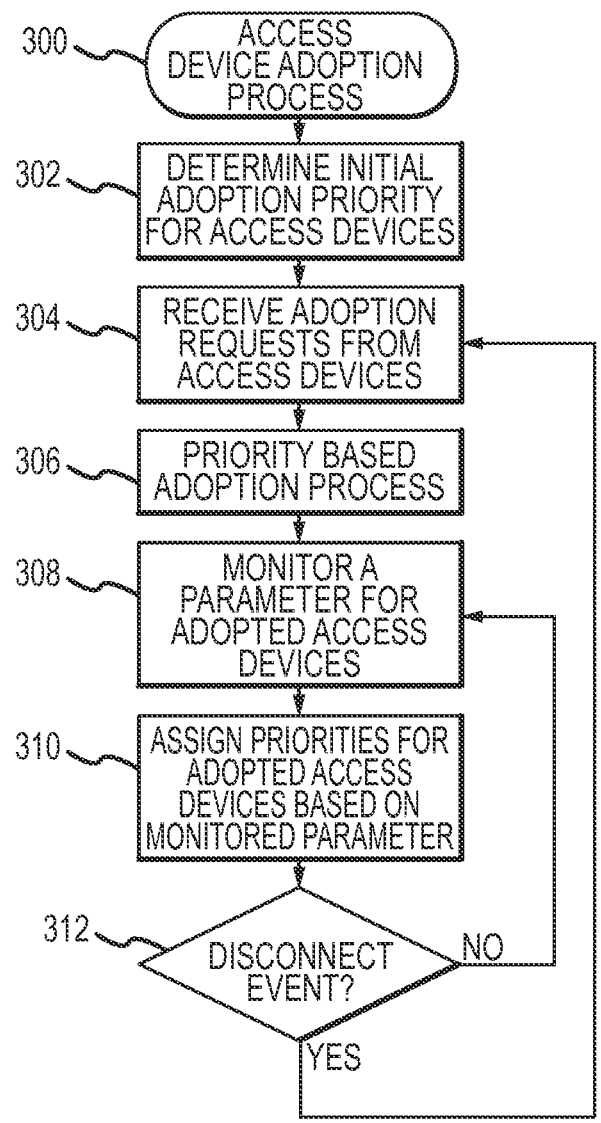
FIG. 3 is a flow diagram of an access device adoption process in accordance with one embodiment.

Referring now to FIG. 3, in an exemplary embodiment, a wireless network may be configured to perform an access device adoption process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, 200, the processor 206, the switching logic 208, and/or the wireless access devices 102. It should be appreciated any number of additional or alternative tasks may be included, and may be incorporated into a more comprehensive procedure or process having additional functionality not described in detail herein.

Referring now to FIG. 3, and with continued reference to FIG. 1 and FIG. 2, the access device adoption process 300 may initialize when a wireless network begins operation, for example, upon initialization of the wireless network or upon resuming operation after regularly scheduled maintenance or downtime. In accordance with one embodiment, the access device adoption process 300 initializes when a wireless switch is turned on or otherwise begins operation. In an exemplary embodiment, the access device adoption process 300 is configured to determine an initial adoption priority for each access device coupled to the wireless switch (task 302). In accordance with one embodiment, the initial adoption priority for each access device may be pre-coded in the wireless switch. The initial adoption priority may be determined subjectively and manually assigned by a network administrator or another user responsible for configuring and supervising operation of the wireless network. Accordingly, the initial adoption priority for the access devices may be determined based on a number of different criteria associated with each access device, such as, for example, the location of the respective access device within the wireless network, and may vary to suit the needs of a particular wireless network. In an exemplary embodiment, the wireless switch maintains the association of access devices and their respective adoption priorities using a unique identifier for each access device (e.g., a media access control (MAC) address).

In an exemplary embodiment, the access device adoption process 300 is configured to receive, at the wireless switch, an adoption request from one or more access devices coupled to the wireless switch, and perform a priority-based adoption process to adopt access devices based on their respective adoption priorities (task 304, 306). For example, when a wireless switch is reset or powered on, one or more access devices are configured to send an adoption request to the wireless switch in response to detecting the presence of the wireless switch. The wireless switch responds to the adoption requests and determines whether to adopt an access device based on its respective adoption priority, as described in greater detail below. In an exemplary embodiment, the wireless switch adopts access devices using a priority-based adoption process until reaching the adoption limit for the wireless switch or until there are no pending adoption requests.

In an exemplary embodiment, the access device adoption process 300 is configured to dynamically maintain the adoption priorities of access devices during operation of the wireless network by dynamically assigning priorities to each access device adopted by the wireless switch based on one or more criteria or operating metrics. The access device adoption process 300 may be configured to monitor one or more parameters, which will be used for assigning adoption priority, for each access device adopted by the wireless switch (task 308). In accordance with one embodiment, the wireless switch (e.g., data traffic monitor 204) is configured to monitor one or more parameters associated with operation of the access devices. For example, the wireless switch may be configured to monitor a throughput metric associated with each adopted access device, such as the data rate or throughput, the packet count or packet rate, or the number of wireless client devices associated with the respective access device. The wireless switch may also be configured to monitor other parameters, such as the type of content being transmitted by and/or associated with each access device or information pertaining to the wireless client devices (e.g., service set identifiers (SSIDs), user names and/or other authorization information) communicating via a respective access device. These and possibly other parameters may be obtained or monitored by the wireless switch and used the assign adoption priorities to access devices as described below.

In an exemplary embodiment, the access device adoption process 300 is configured to dynamically assign a respective adoption priority to each adopted access device based on the monitored parameter(s) (task 310). The adoption priority may be assigned in a variety of manners, depending on the embodiment. In accordance with one embodiment, each access device is assigned a unique adoption priority. For example, each access device may be assigned an adoption priority that corresponds with its throughput, such that the access device with the highest throughput has the highest priority. Alternatively, the access devices may be ordered or grouped, where access devices in the same group may have the same priority. For example, the access devices may be ordered or tiered such that each access device with a throughput exceeding a first threshold value is assigned a first adoption priority (e.g., the highest priority level), each access device with a throughput exceeding a second threshold value (which is less than the first threshold value) is assigned a second adoption priority, and any remaining access device is assigned a third adoption priority (e.g., the lowest priority level). In an even simpler implementation, only two priority levels may be used, one priority level for access devices actively transmitting data and another priority level for access devices that are inactive or idle. In another embodiment, access devices may be assigned adoption priorities based on the type of user (e.g., a preferred subscriber versus a guest user) or the type of data (e.g., time or delay sensitive data, such as video or audio data, versus data or files that can tolerate transmission latency) associated with the access device. For example, a particular user or type of data may be identified, and an access device supporting the identified user or data type may be assigned a higher (or lower) adoption priority.

In accordance with one or more embodiments, some access devices may have a static or fixed priority that is not dynamically assigned during operation of the wireless network. For example, a network administrator may configure the wireless network such that particular access devices always have the highest (or lowest) priority. It will be appreciated in the art that any number of complex priority schemes may be implemented, for example, priorities may be determined and assigned based on multiple parameters. The subject matter described herein is not intended to be limited to any particular priority scheme.

In an exemplary embodiment, the access device adoption process 300 is configured to repeat the process of monitoring and assigning priorities to adopted access devices as long as the wireless network is undergoing routine operations and has not experienced a disconnect event (tasks 308, 310, 312). The loop defined by tasks 308, 310 and 312 may repeat indefinitely during operation of the wireless network. In this regard, the access device adoption process 300 may be configured to wait for a specified time interval before reassigning adoption priorities. As used herein, a disconnect event should be understood as referring to an event or action that causes one or more previously adopted access devices to become unadopted, at least temporarily, and incapable of transmitting and/or communicating data via the wireless switch. For example, a disconnect event may be a reset of the wireless switch in response to a power loss, a manual reset of the wireless switch, or some other fault condition (e.g., a hardware and/or software error at the wireless switch).

In response to a disconnect event, the access device adoption process 300 is configured to receive an adoption request from one or more access devices when the wireless network (or wireless switch) resumes operation after the disconnect (task 304). In an exemplary embodiment, the access devices coupled to the wireless switch detect the presence of the wireless switch almost simultaneously, such that the adoption requests will effectively be received simultaneously when the wireless switch resumes operation. The access device adoption process 300 is configured to respond to the adoption requests and determine which access devices to adopt based on the respective adoption priority of the access devices (task 306). In an exemplary embodiment, previously adopted access devices may be assigned higher adoption priorities based on one or more parameters as described above (e.g., tasks 308, 310), and therefore be given preference and adopted by the wireless switch over other access devices with lower adoption priorities. For example, adopted access devices with higher throughput metrics may be assigned higher priorities than access devices with lower (or none in the case of unadopted access devices) throughput metrics. After a disconnect event, these highly trafficked access devices may be adopted based on their higher priority and thereby minimize the impact of the disconnect event on any associated wireless client devices and/or mobile users.

Figure 4:
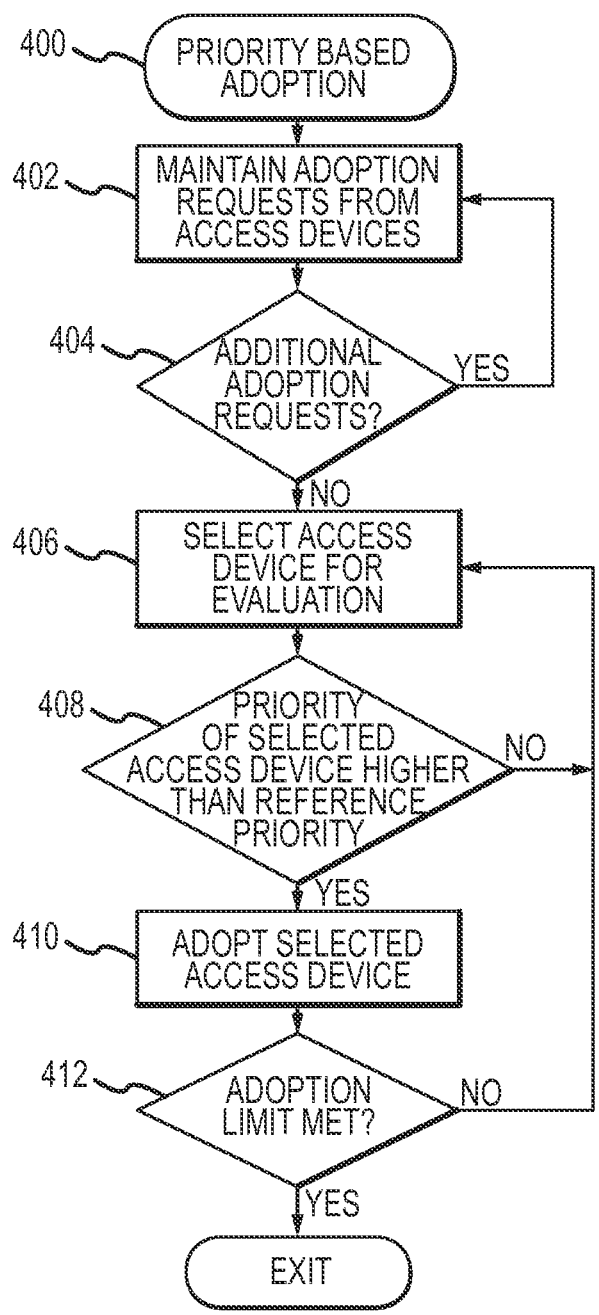
FIG. 4 is a flow diagram of a priority-based adoption process suitable for use in the access device adoption process of FIG. 3 in accordance with one embodiment.

Referring now to FIG. 4, in an exemplary embodiment, a wireless network 100 may be configured to perform a priority-based adoption process 400 and additional tasks, functions, and/or operations as described below. The various tasks may be performed by software, hardware, firmware, or any combination thereof. For illustrative purposes, the following description may refer to elements mentioned above in connection with FIG. 1, FIG. 2, and FIG. 3. In practice, the tasks, functions, and operations may be performed by different elements of the described system, such as the wireless switch 104, 200, the processor 206 and/or the switching logic 208. It should be appreciated any number of additional or alternative tasks may be included, and may be incorporated into a more comprehensive procedure or process having additional functionality not described in detail herein.

Referring now to FIG. 4, and with continued reference to FIG. 1, FIG. 2, and FIG. 3, a priority-based adoption process 400 may initialize when an adoption request is received from one or more access devices in response to initializing and/or resetting a wireless network and/or wireless switch, or a return from a disconnect event (e.g., task 306). In an exemplary embodiment, the priority-based adoption process 400 maintains any received adoption requests and their association with respective access devices (task 402). The wireless switch may be configured to implement a data structure that maintains the association between access device and adoption request, and the priority-based adoption process 400 is not intended to be limited to any particular data structure. In an exemplary embodiment, the priority-based adoption process 400 is configured to continue maintaining the association of adoption requests and access devices as long as additional adoption requests from other access devices are received (tasks 402, 404). In an exemplary embodiment, the priority-based adoption process 400 continues by selecting a first access device for evaluation (task 406). Depending on the embodiment, the priority-based adoption process 400 may be configured to select an access device from the data structure in a sequential manner (e.g., first in first out (FIFO), last in first out (LIFO)) or in a random or arbitrary manner.

In an exemplary embodiment, the wireless switch is configured to analyze the adoption priority for the selected access device and determines how to respond to the adoption request based on the analysis. In accordance with one embodiment, the wireless switch is configured to compare the adoption priority of the selected access device to a reference priority, and if the selected access device has a higher priority than the reference priority, adopt the selected access device (tasks 408, 410). In this manner, access devices that were previously adopted by the wireless switch and assigned a higher priority-based on operating metrics (tasks 306, 308) may be preferentially adopted after a disconnect event. For example, if the wireless switch has an adoption limit of N access devices, the reference priority may be chosen such that the N highest priority access devices are adopted in a preferential manner. If an oversubscribed wireless switch has an adoption limit of forty access devices and assigns priorities to access devices in a sequential manner (e.g., the highest priority access device is assigned a numerical adoption priority of 1), the reference priority may be configured such that access devices with the forty highest adoption priorities (e.g., numerical adoption priorities ≤40) are adopted.

Alternatively, the reference priority may be the adoption priority of another access device which is also attempting to become adopted by the wireless switch. The wireless switch may compare the respective adoption priorities of two access devices, and if the adoption priority of a first access device is higher than the adoption priority of a second access device, the priority-based adoption process 400 may be configured to adopt the first access device before adopting the second access device. Similarly, if the adoption priority of the second access device is higher than the adoption priority of the first access device, the wireless switch may be configured to adopt the second access device before adopting the first access device. It should be appreciated that the manner of establishing a reference priority may vary to suit the needs of a particular system and/or priority scheme, and the subject matter is not intended to be limited to a particular manner of analyzing adoption requests.

In accordance with one embodiment, if the selected access device has a lower priority the than the reference priority, the priority-based adoption process 400 may be configured to maintain the selected access device and its respective adoption request (e.g., in a data structure), and select another access device for evaluation (tasks 406, 408). The priority-based adoption process 400 may be configured to select another access device until each access device with a pending adoption request has been evaluated or the adoption limit of the wireless switch has been met, whichever occurs first. Although not illustrated, in an exemplary embodiment, if each access device with a pending adoption request has been evaluated and the adoption limit of the wireless switch has not been met, the priority-based adoption process 400 may be configured to process the remaining access devices having pending adoption requests. The priority-based adoption process 400 may respond to the remaining pending adoption requests by adopting access devices in a sequential manner or by comparing the adoption priorities of the remaining access devices to a second reference priority. In this regard, the wireless switch may implement a layered adoption priority scheme by making multiple logical passes of the access devices with pending adoption requests until the adoption limit of the wireless switch is met.

After adopting a selected access device, the priority-based adoption process 400 may be configured to determine whether the adoption limit of the wireless switch has been met (task 412). If the adoption limit of the wireless switch has been met, the priority-based adoption process 400 is configured to terminate or exit and deny any pending adoption request, since the wireless switch is not capable of adopting additional access devices. If the adoption limit of the wireless switch has not been met, the priority-based adoption process 400 may be configured to repeat the loop defined by tasks 406, 408, 410, and 412 as desired (e.g., until all access devices are adopted or the adoption limit of the wireless switch is met).

It should be appreciated that the subject matter described herein allows priority-based adoption of access devices to be implemented in a customizable way that optimizes the use of the wireless switch and minimizes the impact of any disconnect event. For example, the wireless switch may be configured by a network administrator to prioritize adopted access devices based on a throughput metric, and thereby ensuring that the most heavily-trafficked access devices higher priority for the limited resources of an oversubscribed wireless switch. This will increase the probability that active access devices will become readopted before any application layer sessions are terminated, and thereby ensure a satisfactory user experience.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for re-adopting wireless local area network access points coupled to a wireless switch after the wireless switch resumes operation after a disconnect of the wireless switch and access point, the method comprising:
assigning and storing a respective adoption priority based on a monitored data throughput metric for each of a plurality of access points previously adopted by, and during previous association with, the wireless switch before the disconnect;

receiving an adoption request from an access point of the plurality of access points after the wireless switch resumes operation; and responding to the adoption request based on the stored respective adoption priority of the access point.

2. The method of claim 1, wherein assigning the respective priority to each access point includes each access point having an initial adoption priority based on a location of the access point.

3. The method of claim 1, wherein the data throughput metric is based on the number of wireless clients associated with each respective access point.

4. The method of claim 1, wherein the throughput metric includes any one of the group consisting of a packet rate and a data rate.

5. The method of claim 1, wherein the number of access points subscribed to the switch exceeds an adoption limit of the switch.

6. The method of claim 1, wherein the switch is operable to adopt access points up to an adoption limit.

7. The method of claim 1, wherein adoption priority is also based on type of data previously communicated by each access point.

8. The method of claim 1, wherein responding to the adoption request based on the respective priority of the access device comprises:

comparing the respective priority of the access device to a reference priority based on a limit to the number of devices that can be adopted by the switch; and if the respective priority of the access device is higher than the reference priority, adopting the access device by the wireless switch.

9. The method of claim 1, further comprising comparing all pending adoption requests to each other, and adopting only the highest priority access points not greater than an adoption limit.

10. The method of claim 1, wherein the adoption request from the access point to the switch is received after the wireless switch is reset.

11. A wireless switch for a computer network, the wireless switch comprising:

a communication module, the communication module being configured to communicate with access devices coupled to the wireless switch;

a processor coupled to the communication module, wherein the processor is configured to:

assign and store a respective adoption priority based on a monitored data throughput metric for each access point of a plurality of access points adopted by and coupled to the wireless switch before a disconnect of the wireless switch and access point;

receive an adoption request from a first access point of the plurality of access points after the wireless switch disconnects and resumes operation, the first access point having been previously adopted by the wireless switch;

respond to the adoption request based on the stored respective adoption priority of the access point.

* * * * *